United States Patent
Panikkar

(10) Patent No.: US 12,314,767 B2
(45) Date of Patent: May 27, 2025

(54) CONTAINERIZED WORKLOAD MANAGEMENT IN CONTAINER COMPUTING ENVIRONMENT

(71) Applicant: Dell Products L.P., Round Rock, TX (US)

(72) Inventor: Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 544 days.

(21) Appl. No.: 17/503,469

(22) Filed: Oct. 18, 2021

(65) Prior Publication Data

US 2023/0123350 A1    Apr. 20, 2023

(51) Int. Cl.
*G06F 9/50* (2006.01)

(52) U.S. Cl.
CPC .......... *G06F 9/505* (2013.01); *G06F 9/5044* (2013.01); *G06F 9/5083* (2013.01); *G06F 2209/5022* (2013.01); *G06F 2209/503* (2013.01); *G06F 2209/508* (2013.01)

(58) Field of Classification Search
CPC ...... G06F 9/505; G06F 9/5044; G06F 9/5083; G06F 2209/5022; G06F 2209/503; G06F 2209/508; G06F 9/5077
See application file for complete search history.

(56) References Cited

U.S. PATENT DOCUMENTS

| | | | |
|---|---|---|---|
| 10,467,036 B2* | 11/2019 | Anwar | H04L 43/024 |
| 10,761,889 B1* | 9/2020 | Jain | G06F 9/5005 |
| 11,436,054 B1* | 9/2022 | Zad Tootaghaj | G06F 9/45558 |
| 2022/0029899 A1* | 1/2022 | Varnavas | H04L 41/0631 |
| 2022/0329651 A1* | 10/2022 | Kim | H04L 67/1008 |
| 2022/0385542 A1* | 12/2022 | Gokan Khan | H04L 43/50 |
| 2023/0109368 A1* | 4/2023 | Ni | G06T 1/20 718/104 |
| 2023/0114504 A1* | 4/2023 | He | G06F 9/5083 718/105 |

OTHER PUBLICATIONS

K. Casey, "5 Approaches to Cloud Automation," https://enterprisersproject.com/article/2021/2/cloud, Feb. 5, 2021, 6 pages.
Kubernetes, "Horizontal Pod Autoscaler," https://kubernetes.io/docs/tasks/run-application/horizontal-pod-autoscale/, Jul. 26, 2021, 9 pages.

(Continued)

*Primary Examiner* — Sisley N Kim
(74) *Attorney, Agent, or Firm* — Ryan, Mason & Lewis, LLP

(57) ABSTRACT

Techniques for managing containerized workloads in a container computing environment are disclosed. For example, a method comprises the following steps. In a container computing environment configured to create an instance of a containerized workload for executing a microservice, the method computes a parameter based on a first set of execution conditions for the microservice, wherein the parameter represents a resource utilization value at which at least one additional instance of the containerized workload is created for executing the microservice. The method then re-computes the parameter based on a second set of execution conditions for the microservice.

20 Claims, 14 Drawing Sheets

(56) References Cited

OTHER PUBLICATIONS

Github, "Vertical Pod Autoscaler," https://github.com/kubernetes/autoscaler/tree/master/vertical-pod-autoscaler, Accessed Aug. 19, 2021, 9 pages.
Github, "kubernetes/autoscaler," https://github.com/kubernetes/autoscaler, Accessed Aug. 19, 2021, 3 pages.

* cited by examiner

FIG. 7

| TIME | NUMBER OF PARALLEL REQUESTS | LOAD (CPU) PER POD | LOAD (MEMORY) PER POD | NUMBER OF PODs |
|---|---|---|---|---|
| 10:05 | 1 | 45% | 63% | 1 |
| 10:07 | 3 | 48% | 67% | 1 |
| 10:09 | 5 | 53% | 70% | 1 |
| 10:11 | 7 | 64% | 73% | 1 |
| 10:13 | 9 | 68% | 75% | 1 |
| 10:15 | 11 | 73% | 77% | 1 |
| 10:17 | 13 | 77% | 79% | 1 |
| 10:19 | 15 | 82% | 80% | 1 |
| 10:21 | 17 | 87% | 82% | 1 |
| 10:23 | 19 | 91% | 84% | 1 |
| 10:25 | 21 | 95% | 86% | 1 |
| 10:27 | 23 | 98% | 89% | 1 |
| 10:29 | 25 | 100% | 91% | 1 |

FIG. 8

| TIME | NUMBER OF PARALLEL REQUESTS | LOAD (CPU) PER POD | LOAD (MEMORY) PER POD | NUMBER OF PODs | TIME TAKEN TO SPIN NEW POD |
|---|---|---|---|---|---|
| 10:05 | 1 | 45% | 63% | 1 | |
| 10:07 | 3 | 48% | 67% | 1 | |
| 10:09 | 5 | 53% | 70% | 1 | |
| 10:11 | 7 | 64% | 73% | 1 | |
| 10:13 | 9 | 68% | 75% | 1 | |
| 10:15 | 11 | 73% | 77% | 1 | |
| 10:17 | 13 | 77% | 79% | 1 | |
| 10:19 | 15 | 55% | 67% | 2 | 958 msec |
| 10:21 | 17 | 59% | 67% | 2 | |
| 10:23 | 19 | 63% | 69% | 2 | |
| 10:25 | 21 | 67% | 72% | 2 | |
| 10:27 | 23 | 71% | 73% | 2 | |
| 10:29 | 25 | 75% | 75% | 2 | |
| 10:31 | 27 | 78% | 77% | 2 | |
| 10:33 | 29 | 58% | 68% | 3 | 1032 msec |

800

CONTAINERIZED WORKLOAD MANAGEMENT IN CONTAINER COMPUTING ENVIRONMENT

FIELD

The field relates generally to information processing systems, and more particularly to containerized workload management in such information processing systems.

BACKGROUND

Information processing systems increasingly utilize reconfigurable virtual resources to meet changing user needs in an efficient, flexible and cost-effective manner. For example, cloud-based computing and storage systems implemented using virtual resources in the form of containers have been widely adopted. Such containers may be used to provide at least a portion of the virtualization infrastructure of a given information processing system. However, significant challenges arise in managing container environments.

SUMMARY

Illustrative embodiments provide techniques for managing containerized workloads in a container computing environment.

For example, in an illustrative embodiment, a method comprises the following steps. In a container computing environment configured to create an instance of a containerized workload for executing a microservice, the method computes a parameter based on a first set of execution conditions for the microservice, wherein the parameter represents a resource utilization value at which at least one additional instance of the containerized workload is created for executing the microservice. The method then re-computes the parameter based on a second set of execution conditions for the microservice.

In some illustrative embodiments, the method may at least one of compute and re-compute the parameter for another microservice wherein the resource utilization value for the microservice is different than the resource utilization value for the other microservice.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments enable, inter alia, dynamic setting of an auto-scaling parameter for individual microservices running in a container computing environment. For example, illustrative embodiments provide for calibration of microservices and dynamic determination (computation) of a target resource setting based on a statistical analysis of actual rate of increase (variations) of load and resource consumption of pods in a production or production-like environment. Further, illustrative embodiments provide for re-calibration (re-computation) and resetting the target resource setting during production with live requests and loads.

While such container management techniques are particularly effective in pod-based container environments, it is to be appreciated that the techniques can be implemented in other container environments.

These and other illustrative embodiments include, without limitation, apparatus, systems, methods and computer program products comprising processor-readable storage media.

BRIEF DESCRIPTION OF THE DRAWINGS

FIGS. 7-11 collectively illustrate dynamic management of a target resource setting in a containerized workload-based environment according to one or more illustrative embodiments.

DETAILED DESCRIPTION

Figure 1:
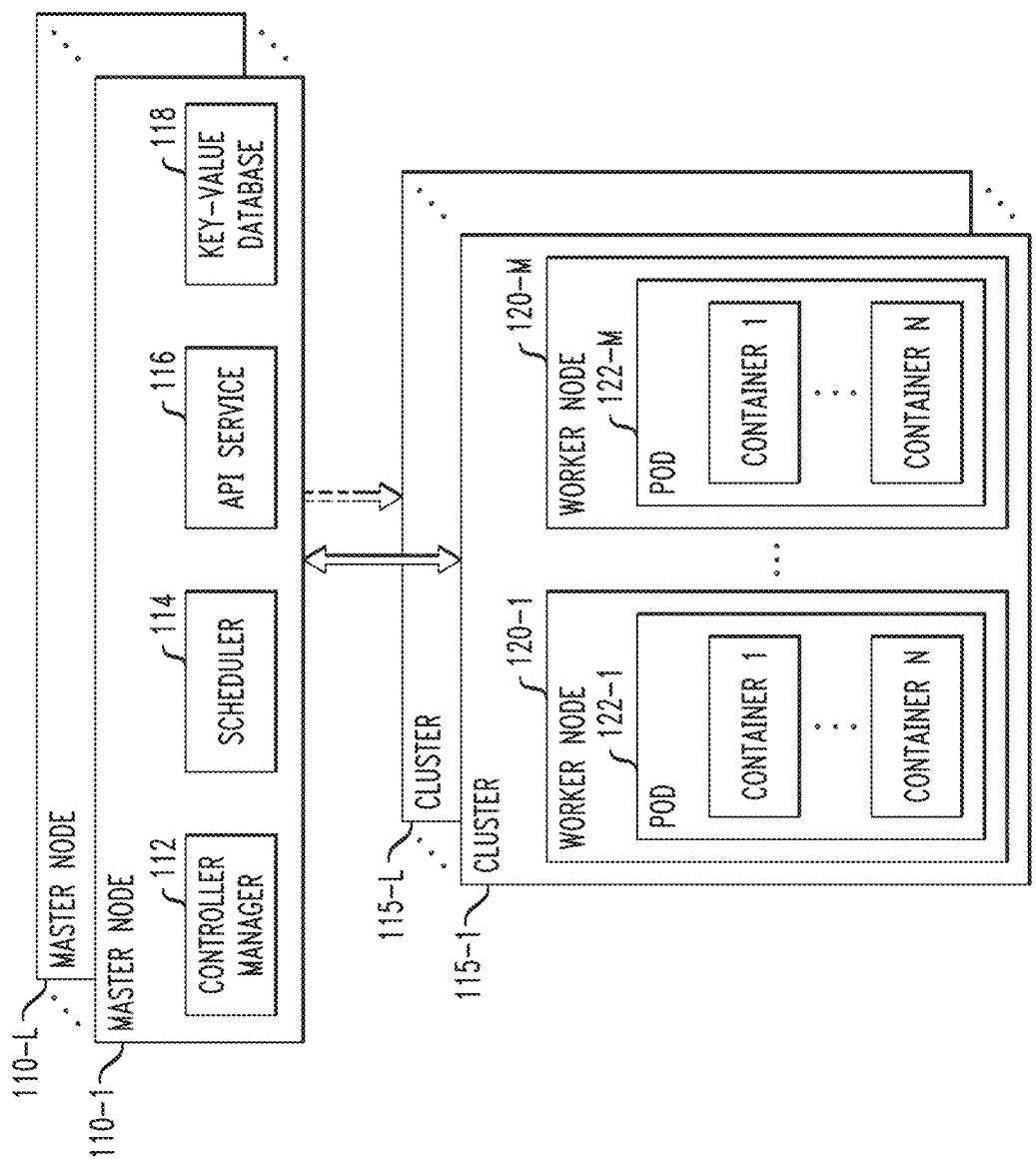
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a least one master node. A Kubernetes environment may include multiple clusters respectively managed by multiple master nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 depicts an example of a pod-based container orchestration environment 100. As shown, a plurality of master nodes 110-1, . . . 110-L (herein each individually referred to as master node 110 or collectively as master nodes 110) are respectively operatively coupled to a plurality of clusters 115-1, . . . 115-L (herein each individually referred to as cluster 115 or collectively as clusters 115). As mentioned above, each cluster is managed by at least one master node. Illustrative embodiments provide for application copy management across multiple clusters (e.g., from one cluster of clusters 115 to another cluster of clusters 115), as will be further explained in detail herein.

Each cluster 115 comprises a plurality of worker nodes 120-1, . . . 120-M (herein each individually referred to as worker node 120 or collectively as worker nodes 120). Each worker node 120 comprises a respective pod, i.e., one of a plurality of pods 122-1, . . . 122-M (herein each individually referred to as pod 122 or collectively as pods 122). However, it is to be understood that one or more worker nodes 120 can run multiple pods 122 at a time. Each pod 122 comprises a set of containers 1, N (each pod may also have a different number of containers). As used herein, a pod may be referred to more generally as a containerized workload. Also shown in FIG. 1, each master node 110 comprises a controller manager 112, a scheduler 114, an application programming interface (API) service 116, and a key-value database 118, as will be further explained. However, in some embodiments, multiple master nodes 110 may share one or more of the same controller manager 112, scheduler 114, API service 116, and key-value database 118.

Worker nodes 120 of each cluster 115 execute one or more applications associated with pods 122 (containerized workloads). Each master node 110 manages the worker nodes 120, and therefore pods 122 and containers, in its corresponding cluster 115. More particularly, each master node 110 controls operations in its corresponding cluster 115 utilizing the above-mentioned components, i.e., controller manager 112, scheduler 114, API service 116, and a key-value database 118. In general, controller manager 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

Figure 2:
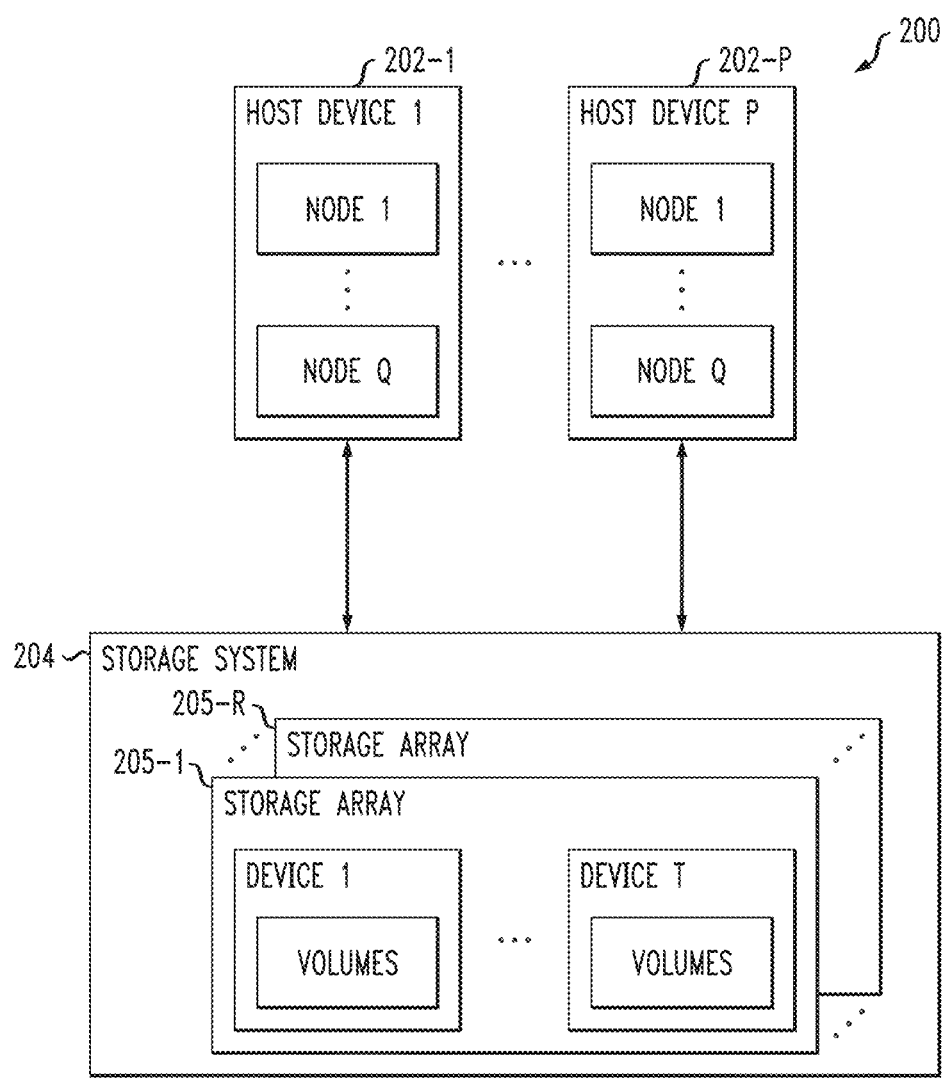
FIG. 2 illustrates host devices and a storage system within which one or more illustrative embodiments can be implemented.

Turning now to FIG. 2, an information processing system 200 is depicted within which pod-based container orchestration environment 100 of FIG. 1 can be implemented. More particularly, as shown in FIG. 2, a plurality of host devices 202-1, . . . 202-P (herein each individually referred to as host device 202 or collectively as host devices 202) are operatively coupled to a storage system 204. Each host device 202 hosts a set of nodes 1, . . . Q. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as storage array 205 or collectively as storage arrays 205), each of which is comprised of a set of storage devices 1, . . . T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202.

Furthermore, any one of nodes 1, . . . Q on a given host device 202 can be a master node 110 or a worker node 120 (FIG. 1). In some embodiments, a node can be configured as a master node for one execution environment and as a worker node for another execution environment. Thus, the components of pod-based container orchestration environment 100 in FIG. 1 can be implemented on one or more of host devices 202, such that data associated with pods 122 (FIG. 1) running on the nodes 1, . . . Q is stored as persistent storage volumes in one or more of the storage devices 1, . . . T of one or more of storage arrays 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments and container management systems in illustrative embodiments, such as those depicted in FIGS. 1 and 2, will be described in more detail below in conjunction with additional figures.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds).

As mentioned above, a Kubernetes pod may be referred to more generally herein as a containerized workload. One example of a containerized workload is an application program configured to provide a microservice. A microservice architecture is a software approach wherein a single application is composed of a plurality of loosely-coupled and independently-deployable smaller components or services. Container-based microservice architectures have profoundly changed the way development and operations teams test and deploy modern software. Containers help companies modernize by making it easier to scale and deploy applications. By way of example, Kubernetes helps developers and microservice operations teams because it manages the container orchestration well. However, Kubernetes is more than a container orchestrator, as it can be considered an operating system for cloud-native applications in the sense that it is the platform that applications run on, (e.g., just as desktop applications run on MacOS, Windows, or Linux). Tanzu from VMWare is a suite of products that helps users run and manage multiple Kubernetes (K8S) clusters across public and private cloud platforms.

Thus, it is realized that microservices provide an ideal architecture for continuous delivery. For example, in an illustrative microservice architecture, each application may reside in a separate container along with the environment it needs to run. Because of this, each application can be edited in its container without the risk of interfering with any other application. However, while there are countless benefits of microservices, the microservice architecture introduces new challenges to developers. One of the main challenges microservices introduces is managing a significant number of microservices for an application.

Several enterprise vendor platforms and Software-as-a-Service (SaaS) frameworks have been introduced to manage microservices such as, but not limited to, Kubernetes, Docker, Pivotal Cloud Foundry (PCF), Azure Kubernetes Service (AKS), Pivotal Container Service (PKS), etc. Along with other microservice management features, these frameworks and platforms attempt to address the scalability of microservices. For a given microservice-based application, as the request load increases or decreases, the container needs to increase or decrease the instances of microservices. In current microservice container environments, automatic scaling or "auto-scaling" is used to attempt to ensure that an application has a sufficient amount of targeted resource capacity allocated to handle the traffic demand. However, current auto-scaling solutions do not address important scaling issues.

Auto-scaling is an important concept in cloud automation. Without auto-scaling, resources (e.g., compute, storage, network, etc.) have to be manually provisioned (and later scaled down) every time conditions change. As such, it will be less likely that the container computing environment will operate with optimal resource utilization and cloud spending.

In the Kubernetes framework, there are actually three auto-scaling features: horizontal pod auto-scaler (HPA), vertical pod auto-scaler (VPA), and cluster auto-scaler (CA). HPA is based on a scale-out concept manually allowing administrators to increase or decrease the number of running pods in a cluster as application usage (e.g., requests) changes. VPA is based on a scale-up concept by adding more central processing unit (CPU) or memory capacity to a cluster. CA is based on a concept of adding or removing clusters in case a cluster itself is overloaded. HPA is typically considered a best practice, i.e., to ensure enough resources are allocated for sufficient operation of a microservice within a cluster. Further, in Kubernetes, an administrator can manually specify a fixed targeted utilization parameter with respect to resources to start replication of a microservice instance.

Figure 3:
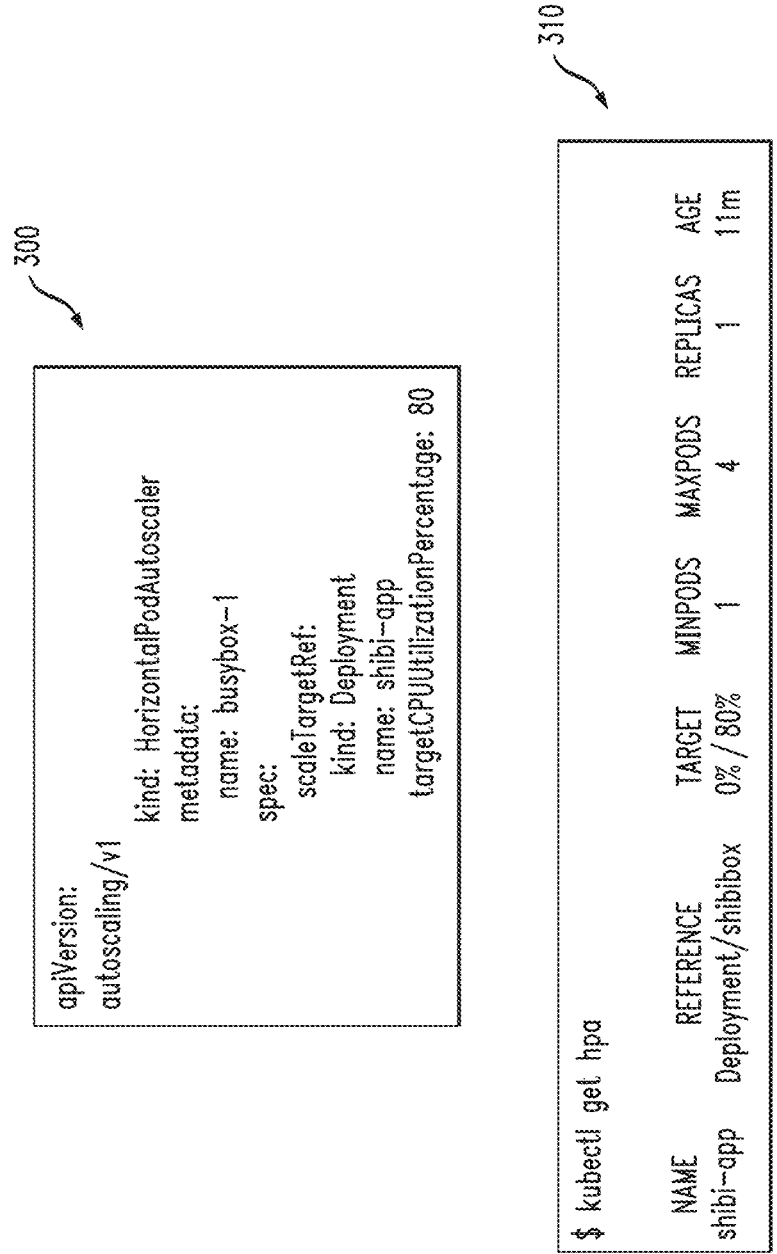
FIG. 3 illustrates an exemplary microservice application deployment with which one or more illustrative embodiments can be implemented.

For example, consider settings 300 in FIG. 3 for HPA with respect to CPU utilization. HPA based on CPU utilization is used as an example in illustrative embodiments. However, container workload management techniques described herein are equally applicable to any metric that can be auto-scaled (e.g., memory capacity, network capacity, etc.).

Further assume a Kubernetes deployment is created for a microservice called "shibi-app" with targetCPUUtilization as 80% depicted as 310 in FIG. 3. This means that the Kubernetes platform (e.g., master node 110 in FIG. 1 or some other component) will start spinning (instantiating, creating, etc.) one or more new pods when the first pod reaches 80% CPU (targetCPUUtilization), i.e., 80% of the CPU capacity is being utilized. The number of pods that are created is calculated with the formula:

$$desiredReplicas = ceil[currentReplicas * (currentMetricValue / desiredMetricValue)]$$

When there are multiple pods, the 80% applies to all pods, meaning that when all pods exceed 80%, the Kubernetes platform will start spinning new pods.

Figure 4:
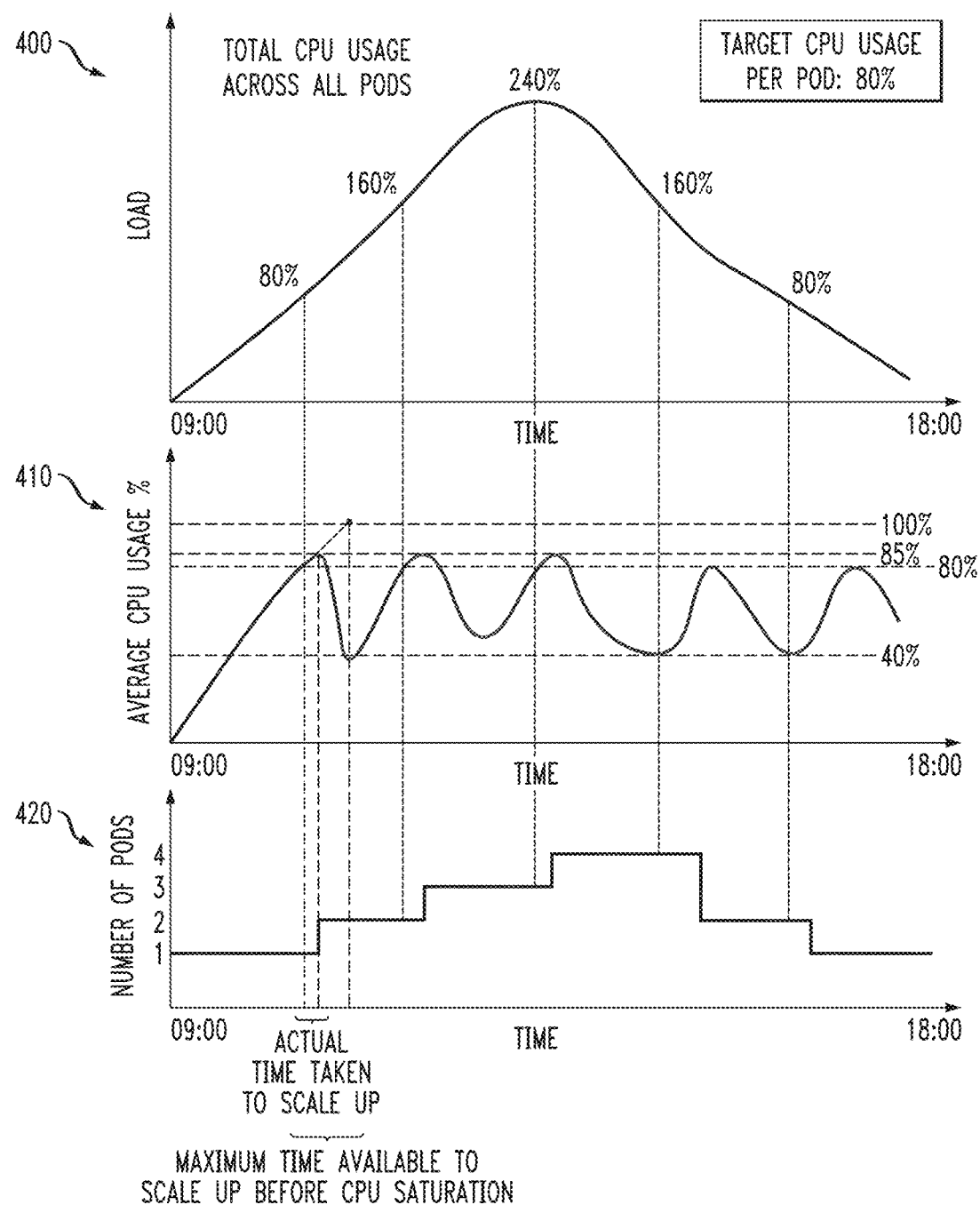
FIG. 4 illustrates a set of metrics associated with execution of a microservice application with which one or more illustrative embodiments can be implemented.

Now consider the steady increase/decrease in the load on this microservice. As shown in FIG. 4, three metrics are represented for a time period of 9 am to 6 pm: load versus time (400 in FIG. 4); average CPU usage percentage versus time (410 in FIG. 4); and number of pods versus time (420 in FIG. 4).

Initially, as graphically represented in FIG. 4, the Kubernetes framework starts with a single pod. When CPU load reaches 80%, the framework spins a new pod. By the time the new pod initializes, the CPU utilization became 85%. Soon after that the CPU usage goes down. However, after a point of time, it starts to increase as average CPU usage increases. When the CPU usage reaches 160%, the average CPU usage reaches 80% (160/2) in each pod. So, the framework starts spinning another pod. Again, assume CPU usage per pod falls. The same cycle repeats until the framework reaches the maximum available CPU capacity. Once the total load decreases, the reverse happens. The framework starts releasing (terminating, etc.) pods at a total CPU usage of 160% and 80%.

One main issue is that if the time to scale up (spinning a new pod) is less than the rate of increase in the pod resource consumption, the pod goes beyond 100% utilization before the new instance (pod) establishes and shares the load. This situation leads to, for example, an out of memory error (e.g., 5xx error in Kubernetes framework).

It is realized herein that the time to scale a new pod depends on factors comprising:
(i) Service behavior: The nature of each microservice can be different; some microservices will take more time to reach to 100%, but some others will take less time.
(ii) Number of requests (load) in each microservice; more parallel requests cause the microservice to reach 100% faster.
(iii) Size of the image and the resource available; the bigger the size of the image, the pod initialization time increases, and lesser available resources increases the initialization time.

It is therefore realized that the above factors vary with each microservice and deployed environment. Thus, as is currently done, maintaining a static targetCPUUtilization parameter based on a rough estimate (so-called "guestimate") may not be accurate all the time and may lead to errors. Currently, there are several issues caused by this fixed parameter approach in a production environment. Note that a production environment is considered when the microservice is made available in real time or online to users, as opposed to offline (sometimes called a test environment). The current remedy is to then reduce the targetCPUUtilization parameter, but again this is only a guestimate by the administrator of some lower value.

Figure 5:
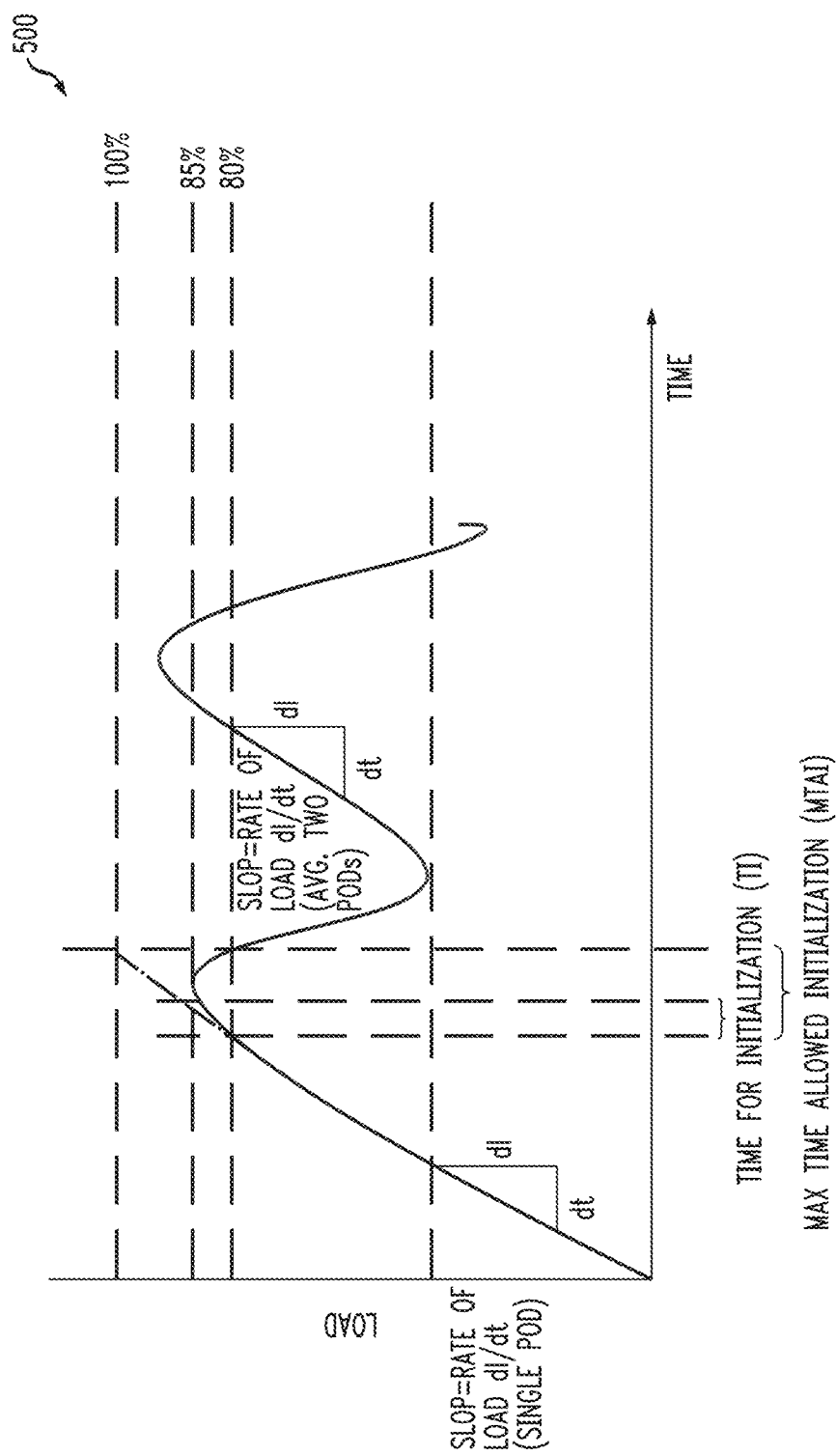
FIGS. 5 and 6 respectively illustrate a change in load associated with execution of a microservice application with which one or more illustrative embodiments can be implemented.
Figure 6:
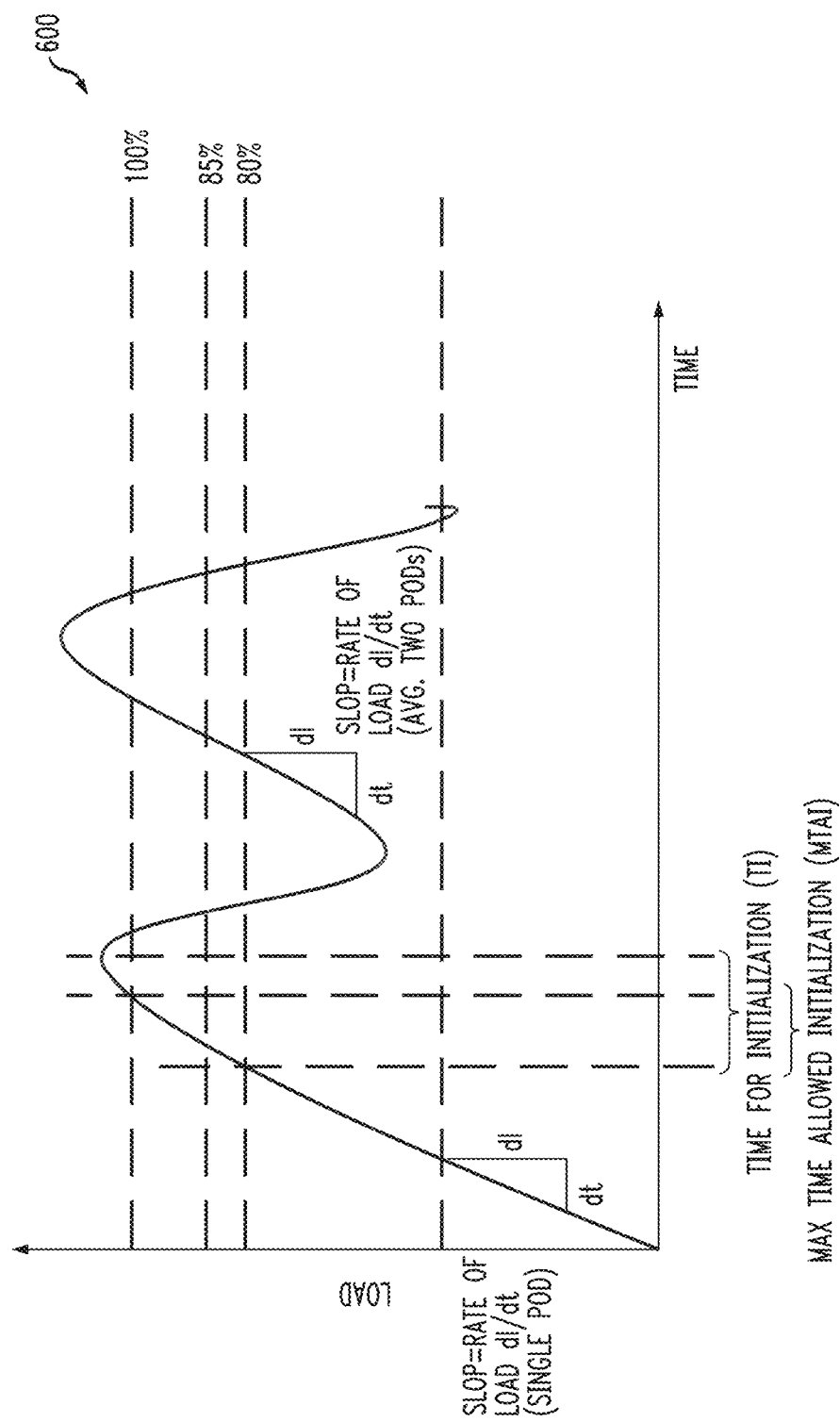

FIGS. 5 and 6 further illustrate the above issues in the context of load and with respect to a time for initialization (TI) and a maximum (max) time allowed for initialization (MTAI) of a pod. Graph 500 in FIG. 5 shows a microservice scenario when the load increases in a microservice, and the framework auto-scales more instances of the microservice according to a pre-defined static setting of a targeted resource (e.g., 80% of CPU). If the load exceeds 80% CPU, then a new instance spins off. Note that the terms auto-scaling parameter, targeted resource setting, cut off percentage parameter, and the like, are used interchangeably herein with the targetCPUUtilization parameter being only one example.

All is fine as TI is less than or equal to MTAI. However, when TI is greater than MTAI, as depicted in graph 600 of FIG. 6, the framework runs into the above issues. Here the rate of increasing load (dl/dt) is higher than the first scenario (FIG. 5), and the time for initialization is more. Hence, the microservice will hit 100% resource utilization before the new pod (instance) initializes and thus fail to serve. Time taken for the new instances, as described above, depends on the size of the microservice image and the current resources. Due to each microservice's behavior, the number of requests are different for different microservices, and the time taken for reaching 80% to 100% is different for different microservices. Some microservices will reach the maximum time allowed faster and some slower (i.e., variation in dl/dt). Also, for the same microservice with more than one instance (more pods), the dl/dt will be different. Accordingly, the static rule for the pre-defined setting for auto-scaling may result in reaching 100% usage before a new microservice instance spins off, resulting in an out of memory error. One remedy is to set the rule to a low value (e.g., 40%). However, in this case, if at 40% of CPU time and the new instance spins off, then this may result in underutilization of instances and inefficient resource consumption.

Accordingly, the problem can be defined as follows: in the current microservices auto-scaling approach, the scale out rule is pre-defined and statically set based on a guestimate. However, due to variability in the microservice and environment (different behavior of microservices, variable load, variation in the resources over a time period, and size of the microservice image), the time for initializing a new instance may be more than the time to reach 100% of resource utilization by a particular microservice. This will lead to errors for microservice clients which is not acceptable.

Illustrative embodiments address this and other issues by enabling dynamic setting of an auto-scaling parameter (e.g., targetCPUUtilization parameter in case of Kubernetes CPU utilization cut off percentage) differently for different microservices based on, for example, the increasing load to peak and production-like resource distribution. As will be further explained, an illustrative embodiment implements a side car module of a microservice (pod or containerized workload) to monitor and register the rate of increase in the load (dl/dt) and time taken for initialization of the new pod (new instance) for the microservice (calibration of rate of load and initialization) in a production-like environment. Thus, illustrative embodiments derive the optimal cut of percentage (optimal targeted resource setting or autoscaling parameter) for different resources. Using this dynamic functionality, microservices can also be re-calibrated in production and values can be set in a timely manner for a pre-defined interval.

Figure 9:
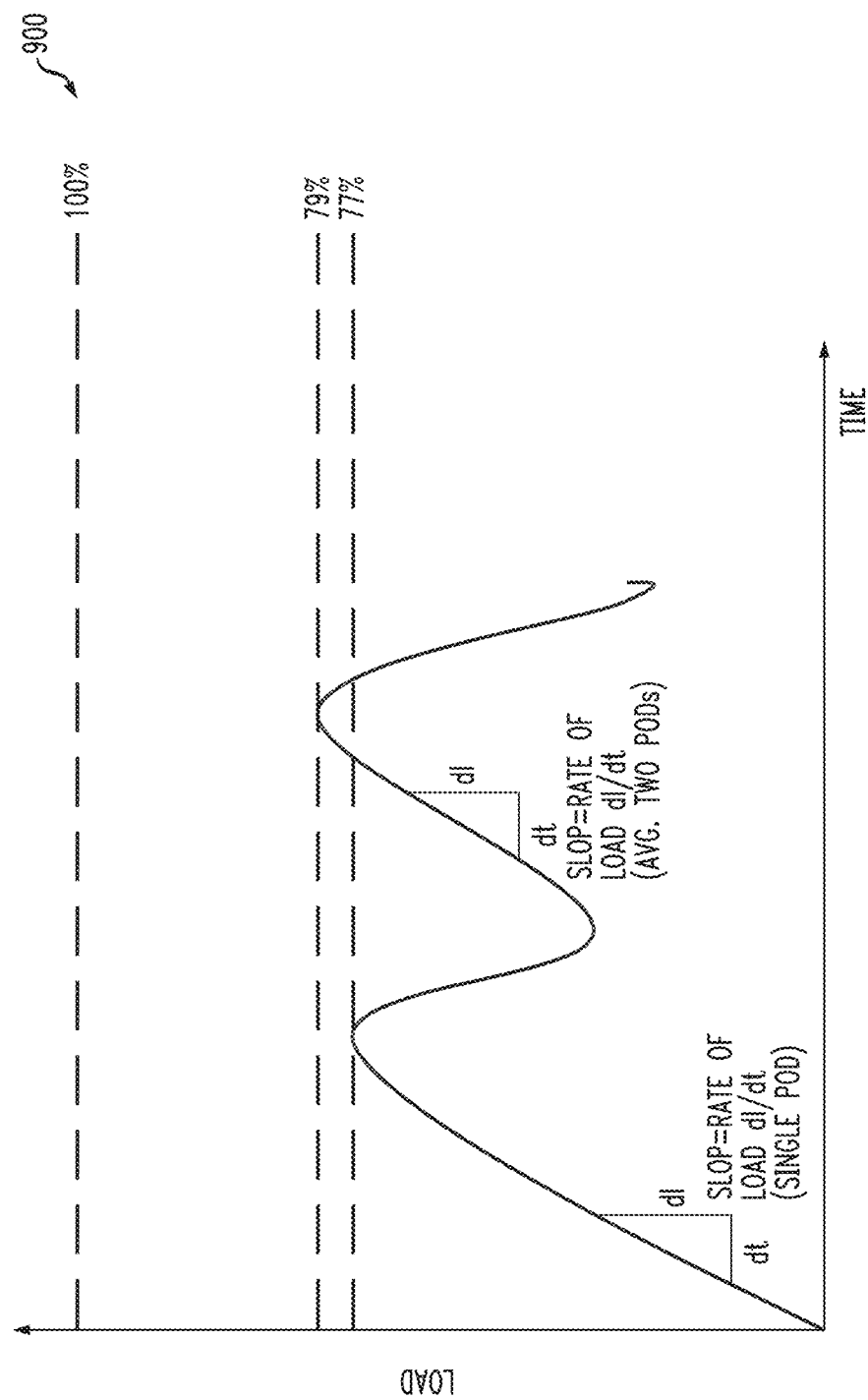

More particularly, the sidecar module for each microservice is configured to register two types of execution conditions: (i) increase/decrease in load with time; and (ii) time for initializing new pod(s) after the cut off percentage parameter is reached. Recall the exemplary deployment described above in the context of FIG. 3, i.e., application "shibi-app". Assume that the first run starts the request 1 to increase the load by increasing parallel requests and captures the cluster CPU and memory consumption without setting any cut off percentage value. For example, see table 700 in FIG. 7. The average increase in the load=dl/dt=2/2 secs=1. Now the framework obtains the median of the saturating resource (CPU, in this example) and sets the cut off percentage value, e.g., median (load CPU)=77%, so targetCPUUtilization=77%. Calibration is re-run until 120% of the maximum parallel requests expected in production. The result is shown in table 800 of FIG. 8 and graph 900 of FIG. 9 considering 120% of the maximum parallel requests is 29.

Figure 10:
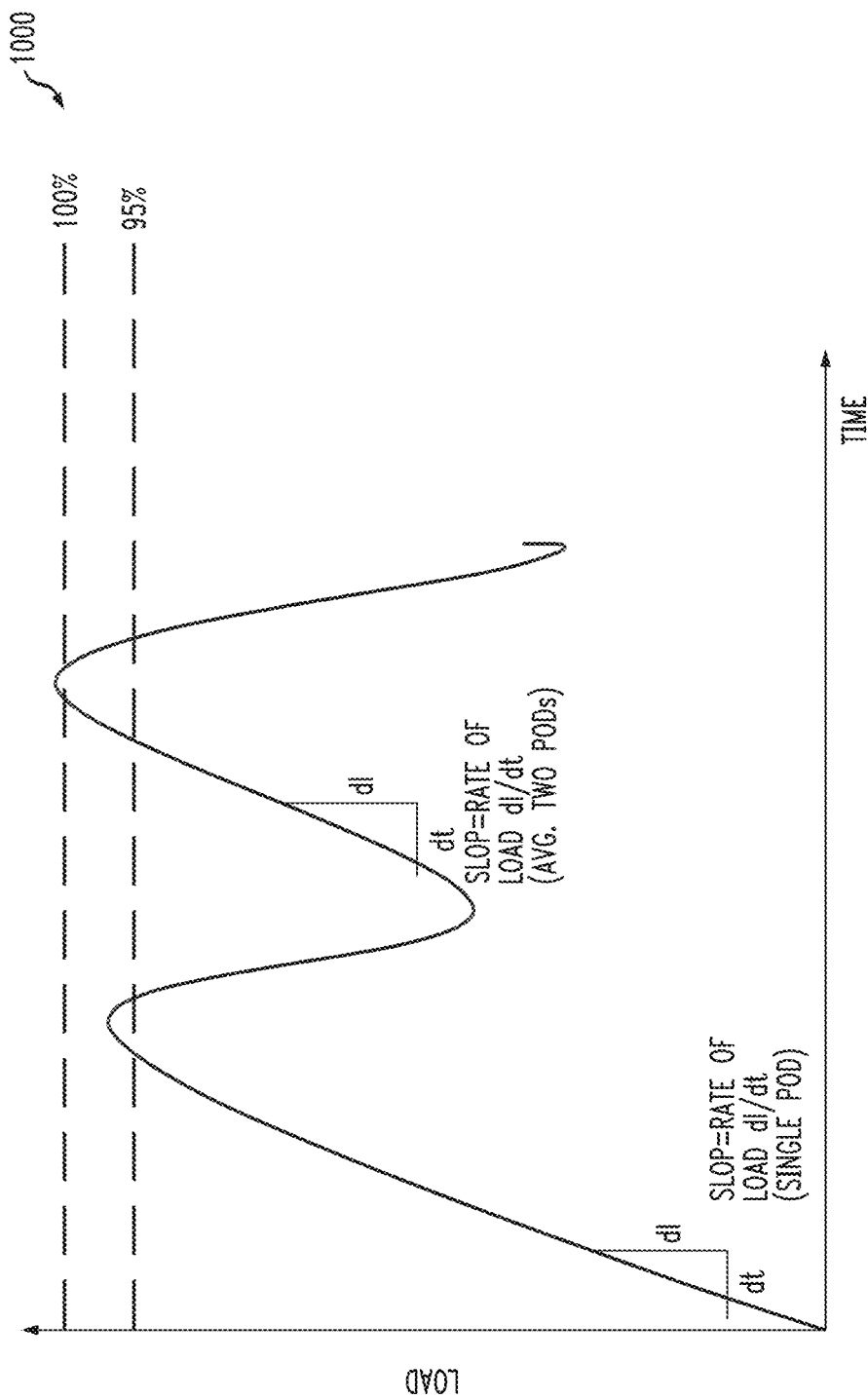

Here, 77% would result in under-utilization of the resource. The average time taken for the initiation of a single pod is (958+1032)/2=995 milliseconds. When multiplied by 50%, considering parallel initialization of multiple pods, the average time is about 1.5 seconds. In the first calibration of a single pod, dl/dt=1, the optimistic cut off CPU value will be computed as: Max %−dl/dt*initialization time, i.e., 100−1*1.5=98.5% or approximately 98%. However, for safety purposes, the previous record in calibration, i.e., 95%, can be selected. As such, targetCPUUtilization is reset to 95%. Calibration is run again and if all is satisfactory until the maximum expected load+20%, then the setting is maintained. This is depicted in graph 1000 of FIG. 10.

Figure 11:
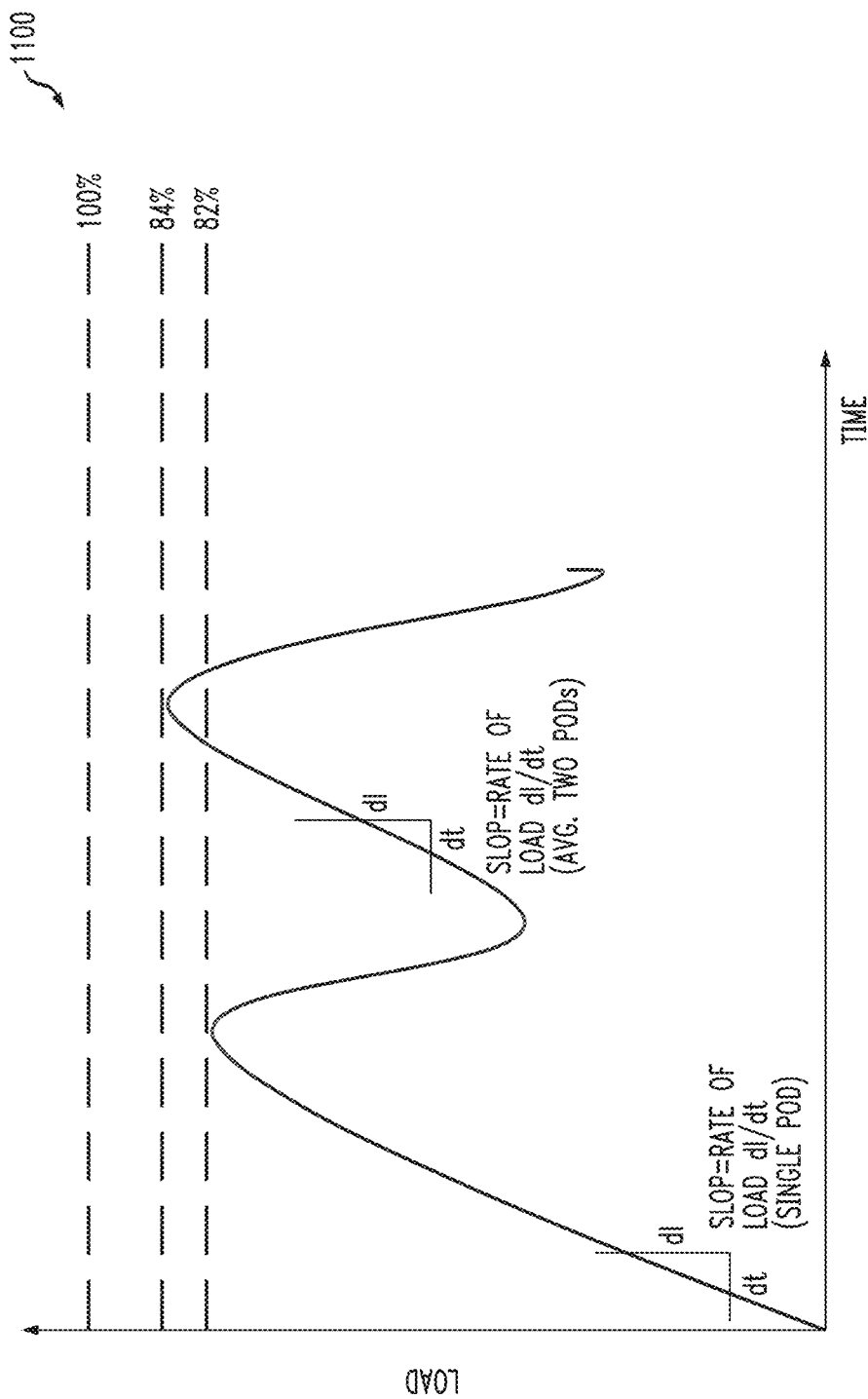

If the microservice reaches 100% CPU again, then the framework reduces the cut off percentage setting, picking the previous value in the first calibration and then reruns the calibration. The optimal setting is thus obtained for that microservice, which can be kept for production. By way of example, in graph 1100 of FIG. 11, the optimal setting for the given microservice is determined to be 82%. It is to be appreciated that in the production environment, calibration can be also performed at run-time, while serving the production load and re-calibrating the setting.

Figure 12:
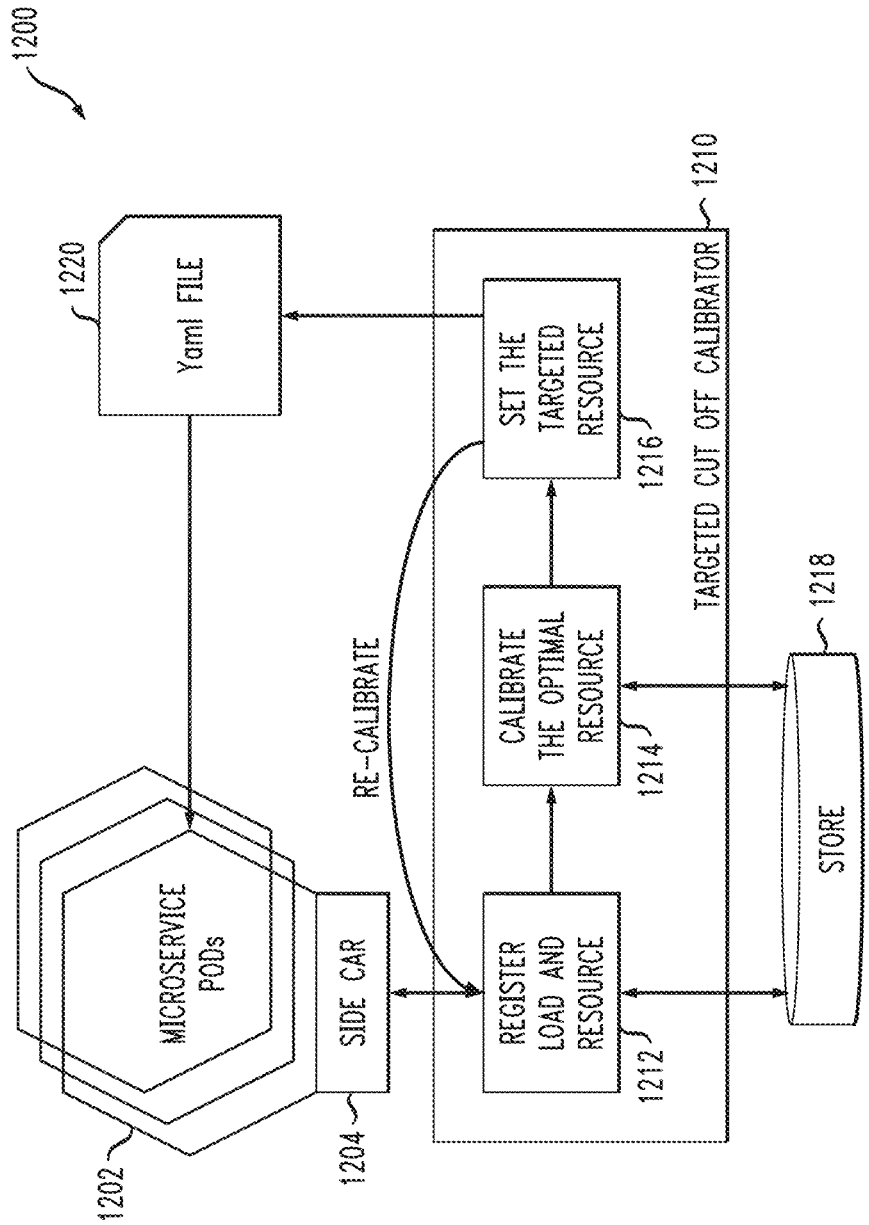
FIG. 12 illustrates a pod-based microservice environment with functionality for dynamic calibration and re-calibration of an auto-scaling parameter according to an illustrative embodiment.

FIG. 12 illustrates a pod-based microservice environment 1200 with functionality for dynamic calibration and re-calibration of an auto-scaling parameter (e.g., cut off percentage, targeted resource setting, etc.) according to an illustrative embodiment. In illustrative embodiments, pod-based microservice environment 1200 can be implemented as part of pod-based container orchestration environment 100 and/or information processing system 200 respectively of FIGS. 1 and 2. As shown, a set of one or more pods 1202 are part of an execution environment for a microservice. At least one side car module 1204 is associated with the set of one or more pods 1202. The side car module 1204 is operatively coupled to a targeted cut off calibrator 1210 which includes a register module 1212, a calibrate module 1214, and a set module 1216. A storage unit 1218 is operatively coupled to register module 1212 and calibrate module 1214. A yaml file 1220 is configured by targeted cut off calibrator 1210 and provided to the set of one or more pods 1202, as further explained below. Side car module 1204 is configured to call register module 1212 to obtain to the number of incoming requests (load) and resource consumption of a given one of the set of one or more pods 1202. Calibrate module 1214 calculates the best targeted resource setting for the specific microservice under the production resource status, as explained above. Set module 1216 then sets the final and optimal target resource setting (autoscaling parameter) in yaml file 1220. Storage unit 1218 stores data for use by register module 1212 and calibrate module 1214.

Figure 13:
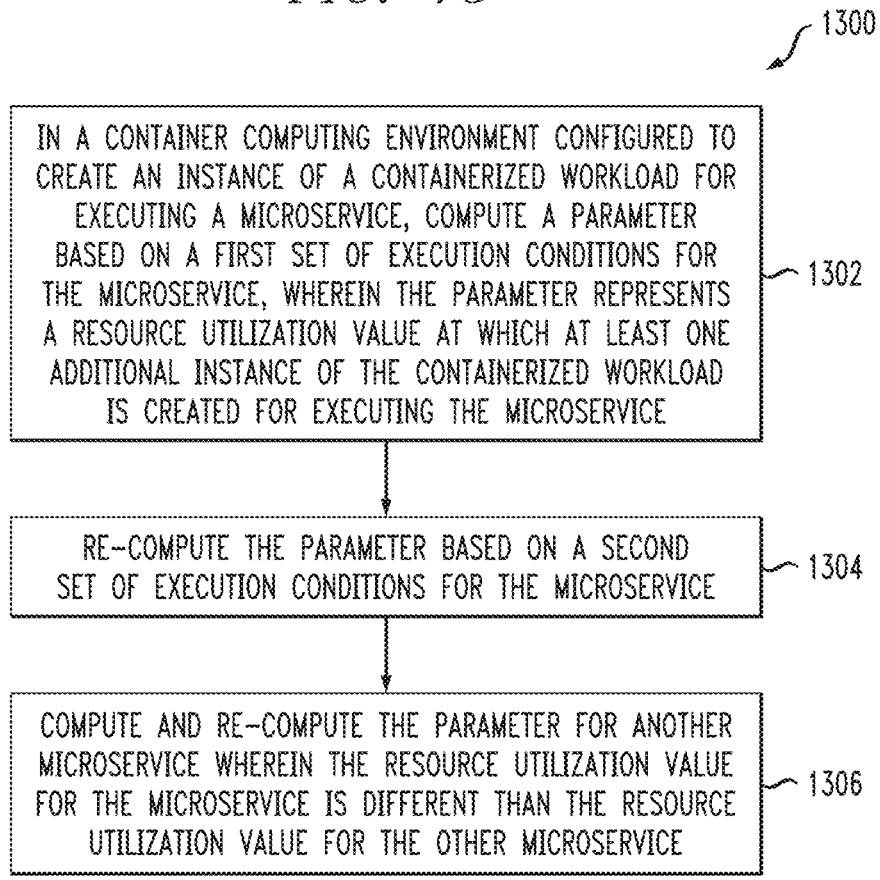
FIG. 13 illustrates a methodology for dynamic management of a target resource setting in a containerized workload-based environment according to an illustrative embodiment.

FIG. 13 illustrates a methodology 1300 according to an illustrative embodiment. As shown, in a container computing environment configured to create an instance of a containerized workload for executing a microservice, step 1302 computes a parameter based on a first set of execution conditions for the microservice, wherein the parameter represents a resource utilization value at which at least one additional instance of the containerized workload is created for executing the microservice. Step 1304 re-computes the parameter based on a second set of execution conditions for the microservice. Step 1306 at least one of computes and re-computes the parameter for another microservice wherein the resource utilization value for the microservice is different than the resource utilization value for the other microservice.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for containerized workload autoscaling management in container environments will now be described in greater detail with reference to FIGS. 14 and 15. It is to be appreciated that systems and processes described in the context of FIGS. 1-13 can be performed via the platforms in FIGS. 14 and/or 15 but may also be implemented, in whole or in part, in other information processing systems in other embodiments.

Figure 14:
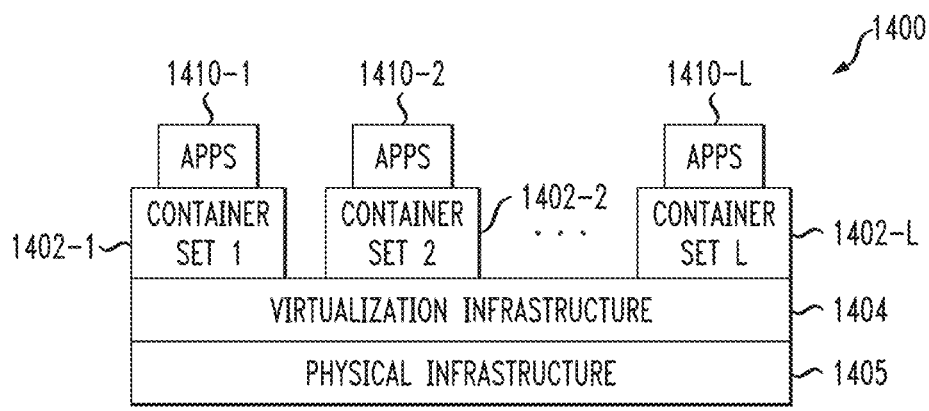
FIGS. 14 and 15 respectively illustrate examples of processing platforms that may be utilized to implement at least a portion of an information processing system with a pod-based container environment according to one or more illustrative embodiments.
Figure 15:
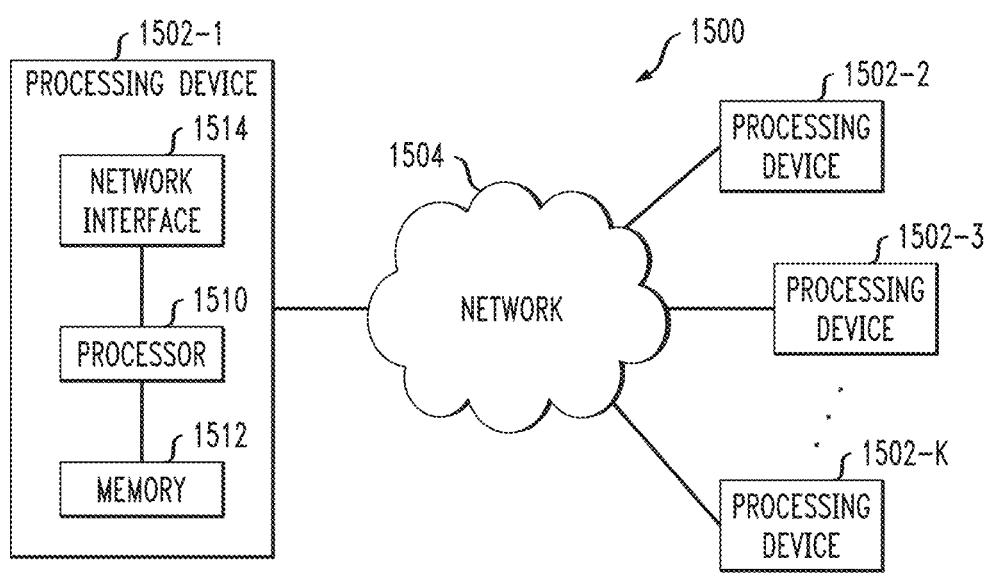

FIG. 14 shows an example processing platform comprising cloud infrastructure 1400. The cloud infrastructure 1400 comprises a combination of physical and virtual processing resources that may be utilized to implement at least a portion of the pod-based container orchestration environment 100 and/or information processing system 200. The cloud infrastructure 1400 comprises multiple container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure.

The cloud infrastructure 1400 further comprises sets of applications 1410-1, 1410-2, . . . 1410-L running on respective ones of the container sets 1402-1, 1402-2, . . . 1402-L under the control of the virtualization infrastructure 1404. The container sets 1402 may comprise respective sets of one or more containers.

In some implementations of the FIG. 14 embodiment, the container sets 1402 comprise respective containers implemented using virtualization infrastructure 1404 that provides operating system level virtualization functionality, such as support for Kubernetes-managed containers.

As is apparent from the above, one or more of the processing modules or other components of pod-based container orchestration environment 100 and/or information processing system 200 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of pod-based container orchestration environment 100 and/or information processing system 200 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and pod-based container orchestration environment 100 and/or information processing system 200 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex™ (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to at least one memory, the at least one processing platform, when executing program code, is configured to:
in a container computing environment configured to create a first instance of a containerized workload for executing a microservice;
implement a module associated with the microservice to monitor and register one or more sets of execution conditions to execute the microservice, wherein the one or more sets of execution conditions comprise at least a rate of change in the first instance of the containerized workload for executing the microservice and a time period to initialize at least one additional instance of the containerized workload;

compute a parameter based on a first set of the one or more sets of execution conditions for the microservice, wherein the parameter is based at least in part on a first rate of change in the first instance of the containerized workload and a first time period to initialize at least one additional instance of the containerized workload and represents a utilization percentage threshold value for a given resource used to execute the microservice at which the at least one additional instance of the containerized workload is created for executing the microservice; and re-compute the parameter based on a second set of the one or more sets of execution conditions for the microservice, wherein re-computing the parameter comprises dynamically adjusting the parameter for the microservice based on a second rate of change in a second instance of the containerized workload and a second time period to initialize another instance of a containerized workload for executing the microservice.

2. The apparatus of claim 1, wherein the at least one processing platform, when executing program code, is further configured to at least one of compute and re-compute the parameter for another microservice wherein the utilization percentage threshold value for the given resource used to execute the microservice is different than the utilization percentage threshold value for the given resource used to execute the other microservice.

3. The apparatus of claim 1, wherein the rate of change and the time period of the first and second sets of execution conditions are respectively represented by load data and temporal data associated with the execution of a containerized workload.

4. The apparatus of claim 3, wherein the load data is indicative of increases and decreases of a number of requests received by the first instance of the containerized workload over time.

5. The apparatus of claim 3, wherein the temporal data is indicative of the first time period to initialize the at least one additional instance of the containerized workload.

6. The apparatus of claim 1, wherein the given resource comprises one of a compute resource, a storage resource, and a network resource.

7. The apparatus of claim 1, wherein the parameter is an auto-scaling parameter in a pod-based computing environment.

8. The apparatus of claim 7, wherein the pod-based computing environment is a Kubernetes framework.

9. The apparatus of claim 1, wherein at least one of the parameter computing and the parameter re-computing are performed in one of a test environment and a production environment.

10. A method comprising:
in a container computing environment configured to create a first instance of a containerized workload for executing a microservice;
implementing a module associated with the microservice to monitor and register one or more sets of execution conditions to execute the microservice, wherein the one or more sets of execution conditions comprise at least a rate of change in the first instance of the containerized workload for executing the microservice and a time period to initialize at least one additional instance of the containerized workload;
computing a parameter based on a first set of the one or more sets of execution conditions for the microservice, wherein the parameter is based at least in part on a first rate of change in the first instance of the containerized workload and a first time period to initialize at least one additional instance of the containerized workload and represents a utilization percentage threshold value for a given resource used to execute the microservice at which the at least one additional instance of the containerized workload is created for executing the microservice; and re-computing the parameter based on a second set of the one or more sets of execution conditions for the microservice, wherein re-computing the parameter comprises dynamically adjusting the parameter for the microservice based on a second rate of change in a second instance of the containerized workload and a second time period to initialize another instance of a containerized workload for executing the microservice.

11. The method of claim 10, further comprising at least one of computing and re-computing the parameter for another microservice wherein the utilization percentage threshold value for the given resource used to execute the microservice is different than the utilization percentage threshold value for the given resource used to execute the other microservice.

12. The method of claim 10, wherein the rate of change and the time period of the first and second sets of execution conditions are respectively represented by load data and temporal data associated with the execution of a containerized workload.

13. The method of claim 12, wherein the load data is indicative of increases and decreases of a number of requests received by the first instance of the containerized workload over time.

14. The method of claim 12, wherein the temporal data is indicative of the first time period to initialize the at least one additional instance of the containerized workload.

15. The method of claim 10, wherein the parameter is an auto-scaling parameter in a pod-based computing environment.

16. The method of claim 10, wherein at least one of the parameter computing and the parameter re-computing are performed in one of a test environment and a production environment.

17. The method of claim 10, wherein the given resource comprises one of a compute resource, a storage resource, and a network resource.

18. The method of claim 15, wherein the pod-based computing environment is a Kubernetes framework.

19. A computer program product comprising a non-transitory processor-readable storage medium having stored therein program code of one or more software programs, wherein the program code when executed by at least one processing platform causes the at least one processing platform to:
in a container computing environment configured to create a first instance of a containerized workload for executing a microservice;
implement a module associated with the microservice to monitor and register one or more sets of execution conditions to execute the microservice, wherein the one or more sets of execution conditions comprise at least a rate of change in the first instance of the containerized workload for executing the microservice and a time period to initialize at least one additional instance of the containerized workload;
compute a parameter based on a first set of the one or more sets of execution conditions for the microservice, wherein the parameter is based at least in part on a first rate of change in the first instance of the containerized workload and a first time period to initialize at least one additional instance of the containerized workload and represents a utilization percentage threshold value for a given resource used to execute the microservice at which the at least one additional instance of the containerized workload is created for executing the microservice; and re-compute the parameter based on a second set of the one or more sets of execution conditions for the microservice, wherein re-computing the parameter comprises dynamically adjusting the parameter for the microservice based on a second rate of change in a second instance of the containerized workload and a second time period to initialize another instance of a containerized workload for executing the microservice.

20. The computer program product of claim 19, further comprising at least one of computing and re-computing the parameter for another microservice wherein the utilization percentage threshold value for the given resource used to execute the microservice is different than the utilization percentage threshold value for the given resource used to execute the other microservice.

\* \* \* \* \*